United States Patent [19]

Karubian

[11] Patent Number: 4,502,184
[45] Date of Patent: Mar. 5, 1985

[54] REVERSIBLE CARCASS SAW

[75] Inventor: Ralph Karubian, Los Angeles, Calif.

[73] Assignee: Kentmaster Manufacturing Co., Inc., Los Angeles, Calif.

[21] Appl. No.: 509,407

[22] Filed: Jun. 30, 1983

[51] Int. Cl.³ .............................................. A22B 5/20
[52] U.S. Cl. ........................................ 17/23; 30/380; 83/788
[58] Field of Search ................. 17/23; 30/380; 83/788

[56] References Cited

U.S. PATENT DOCUMENTS 3,121,910  2/1964  Wells et al. .................... 17/23
4,160,320  7/1979  Wikoff ........................ 17/23 X Primary Examiner—Willie G. Abercrombie
Attorney, Agent, or Firm—Bruce L. Birchard

[57] ABSTRACT

By providing in a carcass saw an easily accessible switch and associated blade-reversing means, serious jamming of the saw-blade and related jumping of the blade out of its guides in the saw are avoided and a return to normal saw operation in minimal time and with minimal damage is assured.

11 Claims, 4 Drawing Figures

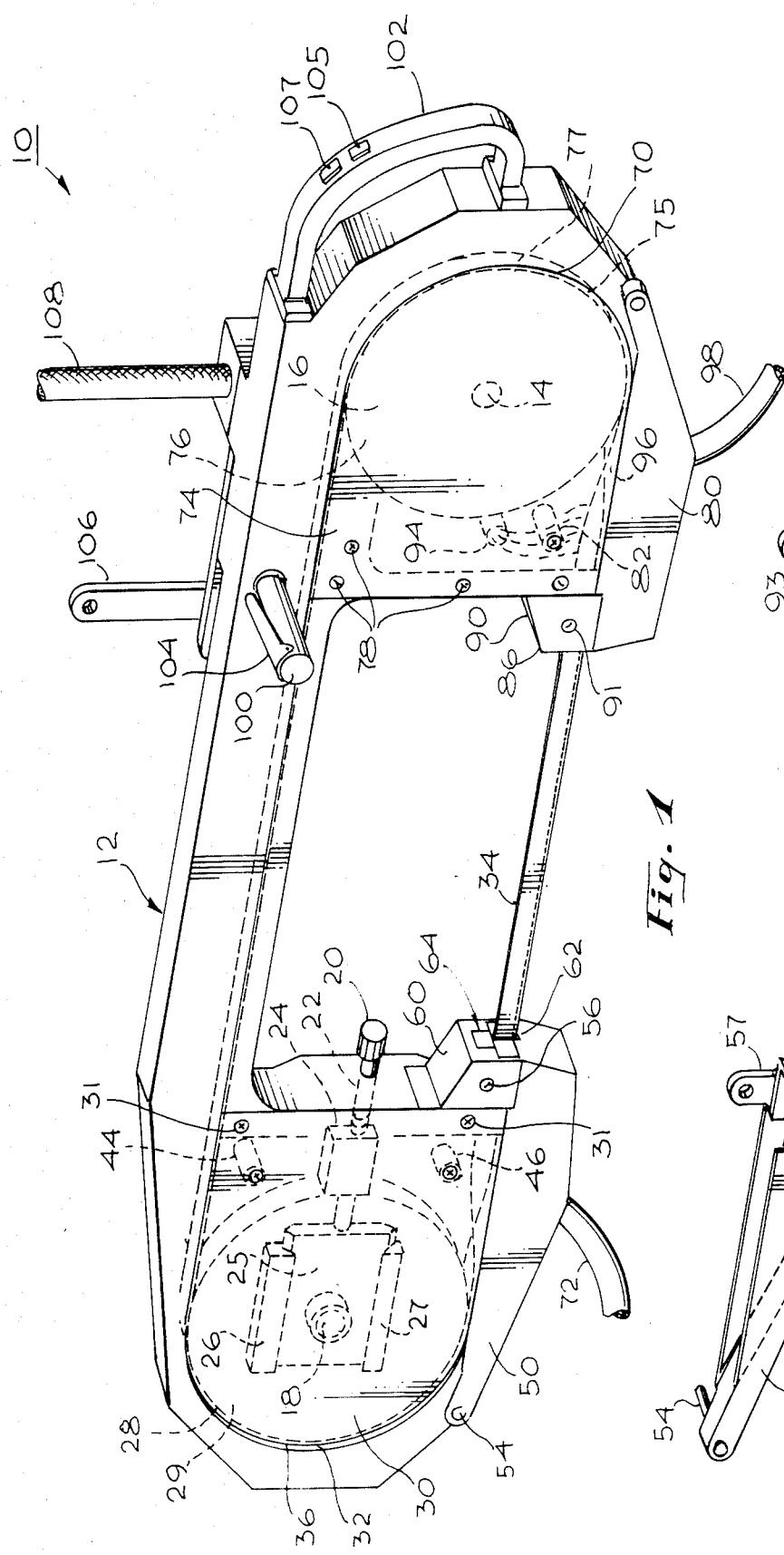
Fig. 1
Fig. 1A
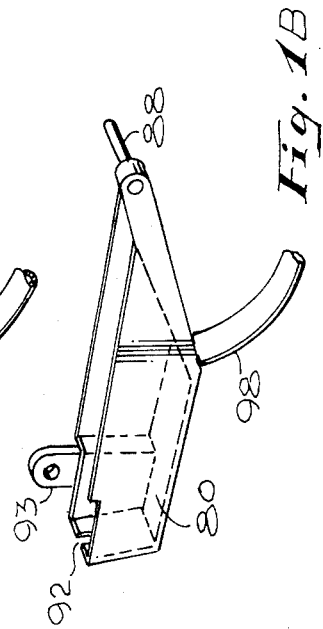
Fig. 1B
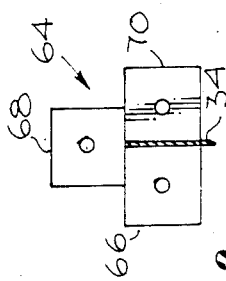
Fig. 2
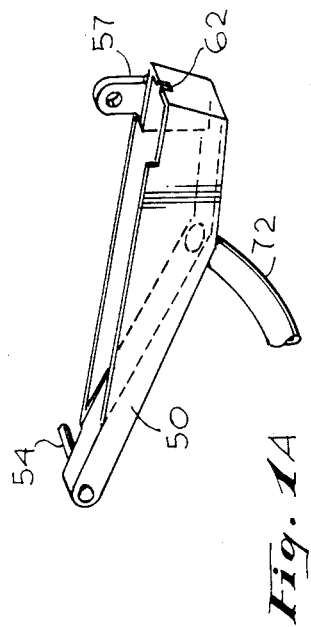

REVERSIBLE CARCASS SAW

BACKGROUND OF THE INVENTION

1. Field of the Invention

This invention relates to tools for use in slaughter houses and, more particularly, to carcass sectioning saws.

2. Prior Art

In the past band saws have been used in sectioning animal carcasses in slaughter houses. Such band saws have suffered from the problem of bone dust and other debris from one carcass being passed on to another carcass. If one of the carcasses is diseased or has deteriorated, successive carcasses may be contaminated and made worthless by such contamination. Such waste material, in the past, has tended to accumulate in the crevices within the saw and no orderly means for preventing such accumulation or removing the bone dust or other waste before it accumulates has been provided. Loss of carcasses arising from contamination can no longer be tolerated in the light of the depressed nature of cattle and meat prices.

A further problem is that if the band saw blade which is used in such carcass saws becomes pinched or jammed in a bone or other portion of the carcass being sawed as a result of miscutting, its removal from the cut by the conventional methods, which are to use the saw handle as a pressure point and to attempt to dislodge the blade from the bone by pivoting the entire saw about the location of the jam or to pull up on the saw, result in the saw-blade's being pulled out of its guides.

Those guides maintain the blade, which is a band, in a position at right angles to its normal orientation as it passes over the drive wheels in the saw. Thus, if the band is pulled out of those guides in the process of trying to pry it loose from a cut, it snaps 90° into a position conforming to that in which it is found as it passes over the wheels which drive it. Re-orienting the band and loading it into its guide slots is time-consuming and a nuisance.

Therefore, it is an object of this invention to overcome various disadvantages set forth hereinbefore.

It is a further object of this invention to provide means for permitting the easy release of a carcass saw blade from a pinched or jammed condition during cutting.

SUMMARY OF THE INVENTION

Stated succinctly, by providing means for easily and quickly reversing the direction of motion of the band which is the blade in the subject carcass saw, the blade may be dislodged from a jammed or mis-cutting condition during cutting without pulling the cutting band or blade out of its orienting guide slots, thus avoiding loss of time and inconvenience in meat production.

BRIEF DESCRIPTION OF THE DRAWINGS

The present invention can best be understood by reading the description which follows in the light of the drawings which are provided herewith in which:

FIG. 1 is a elevational view, in perspective, of a carcass saw according to my invention;

FIG. 2 is an elevational view of a portion of the carcass saw of FIG. 1;

DETAILED DESCRIPTION OF THE PREFERRED EMBODIMENT

Figure 3:
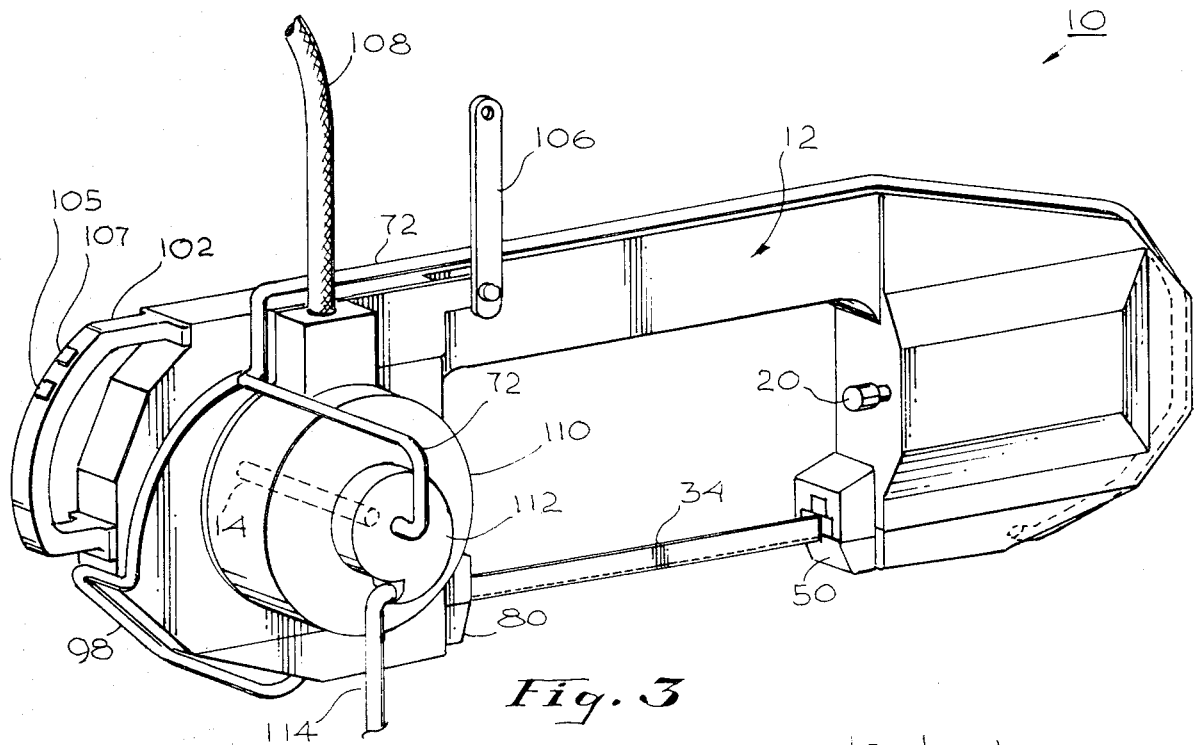
FIG. 3 is a rear elevational view of a modification of the saw of FIG. 1 having additional features.

In FIG. 1, carcass saw 10 includes frame 12 which supports fixed-position axle 14. Axle 14 is driven by an electrical motor not shown in FIG. 1. Such motors are well known in the art and need not be described here. Drive rim 16 is supported on and rotates with shaft 14.

Shaft 18 is parallel to shaft 16 and is adjustable towards and away from shaft 18 by means of tensioning knob 20 which is coupled thru threaded pin 22, adjusting block 24 and slide 25 to shaft 18 to adjust the position of shaft 18 in vee-guides 26, 27. Such adjustment of the position of shaft 18 also adjusts the position of rim 28 which is supported on and rotates with shaft 18. Retainer 26 is supported from frame 12 by means, not shown, since they are not significant to my invention.

A cover 30 having in the region 32, a curvature corresponding to the curvature of rim 28 in that region is supported in a covering relationship with the end face 29 of rim 28. Frame 12, in the region 32, has an edge 36 with a curvature similar to that of cover 30 and rim 28 and is spaced from cover 30 by a distance slightly larger than the thickness of saw blade 34 so that in loading blade 34 it may be easily slipped edgewise into the slot formed by edge 36 and the opposing edge of cover 30.

Cover 30 is held in position by means of retaining fasteners or screws 31 and co-operating tapped elements, such as elements 44, 46 which may be integral with frame 12.

It is to be noted that prior art portable carcass bandsaws had doors over the two wheels or discs which carried the blade. When the blade had to be replaced, the doors (which were hinged) had to be opened exposing the moving wheels. After use for a period of time, the latches and hinges associated with such doors became loose and dangerous, for if a door flew open during use of the saw, a worker could be injured. The permanent fixed covers of this invention eliminate that problem, while providing for easy loading through slots, such as that between cover 30 and the opposite edge 36 of frame 12.

Trough 50, which is positioned beneath rim 28, is rotatably supported at one end from frame 12 by hinge 54. At its other end, trough 50 is secured by means of latch 56, through tab 57 to housing 60, which is an extension of frame 12 as can be seen in FIGS. 1 and 1a. Slot 62 permits passage of blade 34 through one end of trough 50 and also provides stability to the orientation of blade 34. Blade 34 must go thru a 90° twist between its position, lying flat on the driving surface of rim 28 and its cutting position in which it is oriented parallel to the long axis of slot 62. To achieve that rotation, guide block 64 is provided. Guide block 64 may be seen more clearly in FIG. 2.

The bottom of slot 62 provides vertical constraint to blade 34 which passes thru slot 62. In prior art machine removal of the blade from a carcass during cutting to correct a mis-cut often caused blade 34 to be pulled out of guide block 64. When that happened blade 34 tended to snap to the flat position which it assumed in passing over disc 28. The operator then had to stop his work and re-load blade 34 into guide block 64, or its equivalent, a time-consuming procedure.

Guide block 64 comprises a set of metal blocks 66, 68 and 70 of great hardness. For example, blocks 66, 68 and 70 may be made of titanium carbide to assure long life. As has been indicated, guide block 64 is required to rotate blade 34 through 90° between rim 28 and slot 62. It also wipes blade 34 and the debris from such wiping action falls in trough 50 from which it is exhaused through hose 72.

Turning to the fixed rim 16, it is covered, during operation, by cover 74 which is supported over the end face 76 of rim 16 by screws 78 and tapped elements such as element 82. Edge 75 of cover 74 has the same curvature as, and is aligned with, the band saw driving surface 77. Edge 75 is spaced from the opposing edge 70 of frame 12 by a distance slightly greater than the thickness of blade 34, for ease of loading.

Band saw blade 34 is twisted through 90° between guide block 86 and rim 16. The blade 34 is tensioned by adjusting knob 20 after blade 34 has been dropped into place with troughs 50 and 80 open.

Trough 80 is rotatably suspended from pin 88 (FIG. 1b) and, during use, is secured to extension 90 of frame 12 by latch 91 co-operating with tab 93. A slot 92 is provided in trough 80 for the passage of blade 34.

Blade 34 is sprayed with water from spray 94. Slurry thus formed drains through opening 96 into trough 80 and is disposed of through hose 98.

Handles 100 and 102 are provided for manipulating saw 10. Handle 100 may also have trigger 104 for activating an on-off switch 103 (FIG. 4) to produce forward motion of blade 34 in saw 10. An additional switch 105 is carried in handle 102 and will, when operated, produce forward motion of blade 34. On the other hand switch 107, when operated, will activate the circuit of FIG. 4 to reverse the directing of blade 34.

A counterbalance system may be connected to hanger 106.

Electricity is provided through cable 108.

The removal of debris or slurry from troughs 50 or 80 may be enhanced by the provision of a pumping system shown schematically in FIG. 3. In FIG. 3, motor 110 is the main motor which runs saw 10. Its shaft 14 extends not only in the direction to drive disc 16 but, also, in the opposite direction to drive pump 112, which may be a centrifugal pump. Drain lines 72 and 98 from the respective troughs 50 and 80, feed into pump 112 and discharge hose 114 leads to a disposal location. A completely closed waste disposal system is thus provided for saw 10.

Figure 4:
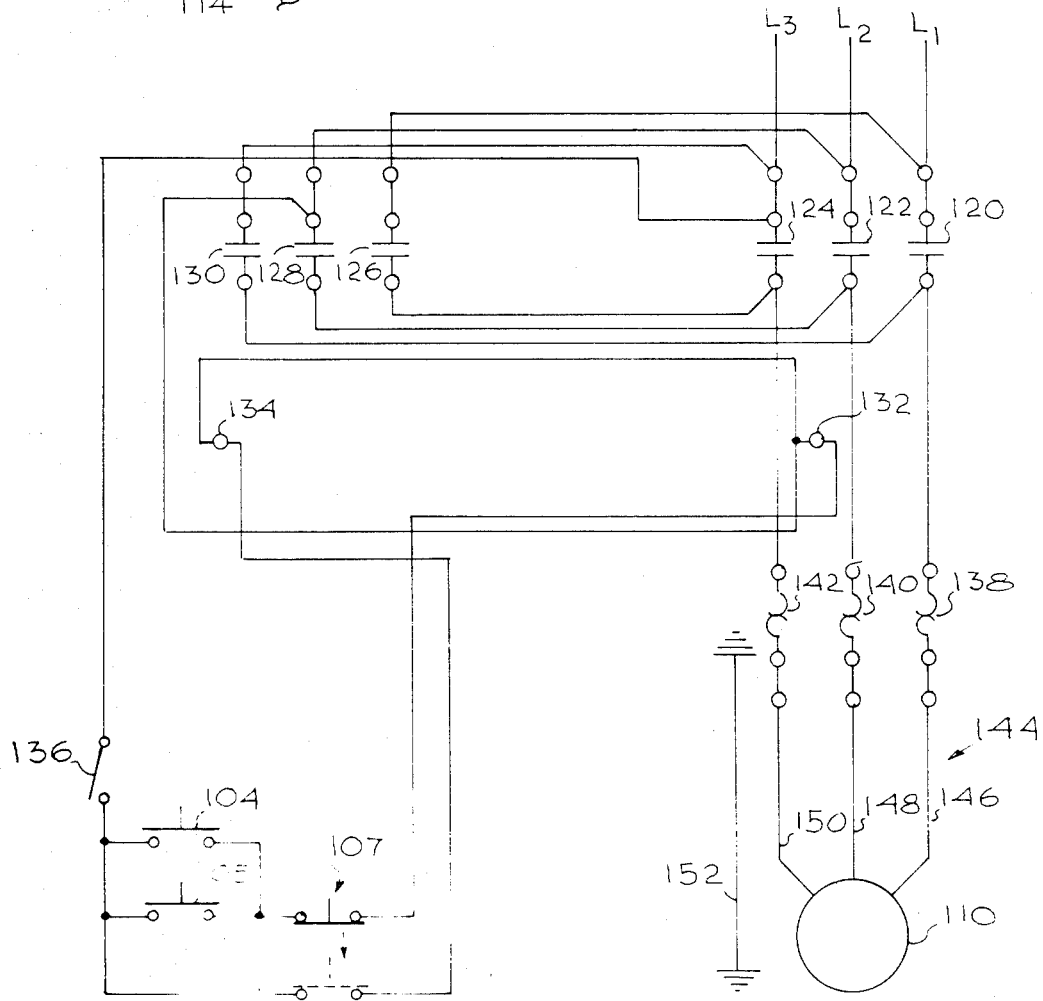
FIG. 4 is a schematic circuit diagram of a reversible drive motor system for use with the saw of FIG. 1.

Turning to FIG. 4, operating power for motor 110 is provided from power lines L1, L2 and L3 through a series of normally open solenoid operated switches 120, 122, 124, 126, 128 and 130, which together with solenoids 132, 134 form a simplified magnetic starter.

These switches comprise two sets of solenoid operated switches. One set includes switches 120, 122 and 124 and is operated by solenoid 132. When solenoid 132 is energized, switches 120, 122 amd 124 are closed and shaft 14 in motor 110 turns in a direction so that blade 34 is moving in a forward direction. Conversely, when solenoid 134 is energized, switches 126, 128 and 130 are closed and shaft 14 in motor 110 rotates in a direction such that blade 34 moves in a reverse direction, i.e. a non-cutting direction. Energization of solenoid 132 is effected by closing either of the "forward" switches 104 or 105, after master switch 136 is closed. Three-phase power flows from lines L1, L2 and L3 through switches 120, 122 and 124 and thermal cut-outs 138, 140 amd 142 and cable 144 comprising conductors 146, 148 and 150 and ground lead 152 to motor 110.

Conversely, when reversing switch 107 is activated, i.e., moved to the dotted line position in FIG. 4, switches 120, 122 and 124 remain open and switches 126, 128 and 130 are closed by solenoid 134. This results line L1 being connected to connector 150, L2 being connected to connector 148 and line L3 being connected to connector 146. The phases having been reversed, motor 110 reacts by reversing the direction of its shaft 14, thus reversing the direction of motion of band saw blade 34. Blade 34 automatically and quickly dislodges itself from the cut it has been making, with physical maneuvering of saw 10 and, hence, without blade 34 coming out of its guide slots in guide blocks 64 and 84, even if slots 62 and 64 do not exist. The dislodging can be done quickly and safely by this reversing of motor 110. Thus, loss of production time is avoided.

Thus, there has been provided an improved carcass saw which is safe to operate, is easy to operate, which is free from the problem of contaminating successive carcasses on which cutting is performed and which quickly recovers from jamming or mis-cutting in the cutting process.

While a particular embodiment has been shown and described, it will be apparent to those skilled in the art that variations and modifications may be made therein without departing from the true scope and spirit of the invention. It is the purpose of the appended claims to cover all such variations and modifications.

I claim:

1. An improved carcass saw, including:
   a frame;
   first and second rims spaced from each other and each rotatably supported from said frame;
   a common saw blade carried by both of said rims;
   adjusting means for adjusting the spring between said rims for tensioning said common saw blade;
   motor means coupled to one of said rims for causing such rim to rotate in a first direction, whereby said saw blade is caused to move in a first direction; and,
   reversing means coupled to said motor means for reversing the direction of rotation of said motor means, whereby said saw blade is caused to move in the opposite direction.

2. Apparatus according to claim 1 in which said motor means is an electrical motor.

3. Apparatus according to claim 1 including, in addition,
   a pair of guide blocks supported from said frame adjacent respective ones of said rims for orienting said blade;
   first cover means supported from said frame and covering said first rim,
   second cover means supported from said frame and covering said second rim; and,
   first and second troughs rotatably supported from said frame beneath said first and second rims, respectively.

4. Apparatus according to claim 3 which includes, in addition, slurry exhaust means connected to each of said first and second troughs.

5. Apparatus according to claim 3 which includes, in addition, securing means for fixedly securing said troughs to said frame.

6. Apparatus according to claim 3 in which said covers each has, when in place, an edge conforming in contour to the contour of the rim proximate to it and said frame has an edge opposed to each of said edges of said covers and spaced therefrom by a distance approximating the thickness of said saw blade.

7. Apparatus according to claim 4 in which said slurry exhaust means comprises, in each case, a hose.

8. Apparatus according to claim 3 which includes, in addition, spraying means positioned proximate to said blade and operative to cause spraying liquid to impinge upon said blade whereby said blade is cleaned and slurry is formed.

9. Apparatus according to claim 3 in which each of said troughs has a slot therein for the passage and guidance of said saw blade.

10. Apparatus according to claim 3 in which said frame has openings therethrough proximate to said at least one spray for the passage of slurry to its associated trough.

11. Apparatus according to claim 9 which includes, in addition, pump means coupled to said troughs and having slurry discharge means.

* * * * *